US007187959B2

(12) United States Patent
Ponce De Leon et al.

(10) Patent No.: US 7,187,959 B2
(45) Date of Patent: Mar. 6, 2007

(54) ANTENNA STRUCTURE FOR DEVICES WITH CONDUCTIVE CHASSIS

(75) Inventors: Lorenzo A. Ponce De Leon, Lake Worth, FL (US); Alejandro Candal, Davie, FL (US); John P. Chenoweth, Coral Springs, FL (US); David Hartley Minasi, Fort Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 497 days.

(21) Appl. No.: 10/721,572

(22) Filed: Nov. 25, 2003

(65) Prior Publication Data

US 2005/0113037 A1 May 26, 2005

(51) Int. Cl.
*H04M 1/00* (2006.01)

(52) U.S. Cl. .............................. 455/575.7; 455/575.3; 455/575.1; 455/90.3; 379/433.13; 343/900; 343/901

(58) Field of Classification Search ............ 455/550.1, 455/575.1, 575.3, 575.7, 90.1–90.3; 379/433.01, 379/433.11, 13; 343/702, 895, 900–901, 343/906
See application file for complete search history.

(56) References Cited

U.S. PATENT DOCUMENTS

| | | | | |
|---|---|---|---|---|
| 6,359,592 | B1 * | 3/2002 | Chen et al. | 343/702 |
| 6,518,928 | B1 | 2/2003 | Sheu | |
| 6,556,171 | B2 | 4/2003 | Gillon | |
| 6,577,279 | B1 | 6/2003 | Shoji et al. | |
| 2002/0006809 | A1 * | 1/2002 | Kubo et al. | 455/550 |
| 2002/0193138 | A1 * | 12/2002 | Chiba et al. | 455/550 |

* cited by examiner

*Primary Examiner*—Matthew Anderson
*Assistant Examiner*—Tuan Tran

(57) ABSTRACT

A multiband element antenna (120) used in combination with a unique metal chassis design that enhances antenna performance and that enables the design of a compact and efficient antenna system. A cellular flip phone (100) that has a conductive chassis includes a flip up antenna (120) that pivots between an extended and a retracted position. The antenna (120) pivots at a point that is located on one edge of the top of the cell phone body (102). The conductive chassis of the flip cover (104) is grounded to the flip phone body (102) at a single point or single surface that is substantially opposite the antenna RF feed (122). Conductive surfaces of the cellular flip phone body (102) are grounded at a single point that is near the antenna RF feed point (122). This grounding arrangement has been found to control the flow of induced currents on the conductive portions of the flip cover (104) and body (102), thereby improving the performance of the device's antenna (120).

18 Claims, 3 Drawing Sheets

ANTENNA STRUCTURE FOR DEVICES WITH CONDUCTIVE CHASSIS

FIELD OF THE INVENTION

The present invention generally relates to the field of wireless communications devices and more particularly to radio antenna designs for incorporation into wireless communications devices.

BACKGROUND OF THE INVENTION

Portable communications devices, such cellular telephones, are becoming more compact and adapting distinct design features. One design that provides both functional and aesthetical benefits is the flip-phone design. The flip phone design has a cover that flips from a closed or folded position to an open or extended position. The cover may contain a speaker or microphone so that when the cover is placed into its extended position, the cover is able to act as part of the phone structure and extend the earpiece or microphone away from the body of the phone. This allows the body of the phone to be correspondingly smaller.

A recognized problem with using a flip phone design is that the performance of a clam shell cellular phone antenna is degraded when mounted on a metal chassis phone. The mechanism that creates the degradation includes currents that are induced by the antenna on the metal phone chassis. These currents cancel a portion of the radiation field that is generated by the antenna currents. Despite this problem, the use of metal chassis in flip phone designs has several advantages. When using a metal chassis in a flip phone design, the dimensions of the antenna are typically increased in order to recover this lost radiation performance. Increasing the antenna dimensions, however, negatively impacts the styling and distinctiveness of the product.

Therefore a need exists to overcome the problems with the prior art as discussed above.

SUMMARY OF THE INVENTION

According to a preferred embodiment of the present invention, a wireless communications device has a body having a first edge and a second edge. The second edge is located substantially opposite the first edge. The wireless communications device further has an antenna that is driven by an RF feed that is located in the area of the first edge. The wireless communications device also has a flip cover that has a conductive portion. The conductive portion of the flip cover is electrically connected to ground within the body substantially in the area of the second edge According to another aspect of the present invention, a wireless communications device has a body that has a conductive body portion and an antenna cavity that is located on a surface of the body. The wireless antenna device also has an antenna that is physically mounted to the body at a point near the antenna cavity. The antenna is able to be retracted into the antenna cavity and extended away from the antenna cavity. The wireless communications device also has a dielectric substrate that is mounted in proximity to the antenna cavity such that a resonant frequency of the antenna is substantially maintained when the antenna is retracted into the antenna cavity and when the antenna is extended from the antenna cavity.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

The present invention, according to a preferred embodiment, overcomes problems with the prior art by providing a multiband element antenna in combination with a unique metal chassis design that enhances antenna performance and that enables the design of a compact and efficient antenna system. The design of the exemplary embodiment of the present invention is a cellular flip phone that has a chassis that includes the skin or case of the phone and that includes conductive portions on both the flip cover and body of the phone. A flip up antenna is also incorporated into the cellular flip phone. The flip up antenna of the exemplary embodiment pivots between an extended and a retracted position. The flip up antenna pivots around an antenna pivot point that is also an RF feed for the antenna. The antenna pivot point is located on one edge of the top of the cell phone body. The conductive surface portions of the flip cover of the exemplary embodiments are grounded to the body of the phone at substantially a single point that is on the end of the top of the body that is substantially opposite the end that has the mounting for the antenna RF feed. The conductive surfaces of the cellular flip phone body, such as a conductive battery cover, a frame, at lest one shield, a battery, and at least one battery contact, are grounded at a single point that is substantially located near the antenna RF feed point. This grounding arrangement for the flip cover and the conductive surfaces of the body has been found to advantageously control the flow of induced currents on the conductive portions of the flip cover and body, thereby improving the performance of the device's antenna.

Figure 1:
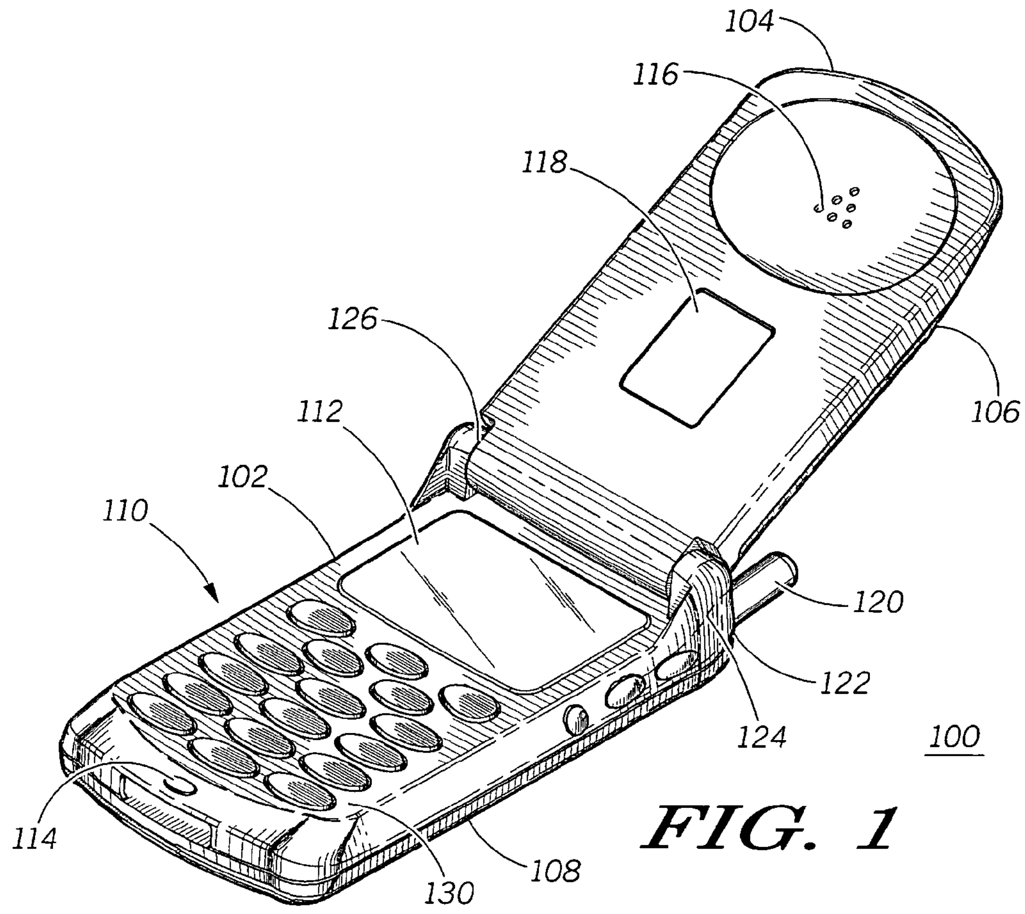
FIG. 1 is an isometric view of a cellular flip phone with an open cover that incorporates a flip-up antenna according to a preferred embodiment of the present invention.

Referring to FIG. 1, there is shown an isometric view of a cellular flip phone 100 with an open cover 104 and incorporating a flip-up antenna 120 according to an exemplary embodiment of the present invention. The exemplary flip phone 100 outwardly resembles a conventional flip phone and includes a body 102 and a flip cover 104. The flip cover 104 is attached to the body 102 by a flip cover pivot that consists of a first pivot point 124 and a second pivot point 126. The body 102 has a body front 130 that serves to mount components such as a conventional cellular phone keypad 110, a microphone 114 and a main display 112. The body front 130 of the exemplary embodiment includes a conductive metal portion that supports these components. The flip cover 104 of the exemplary flip phone 100 includes an earpiece 116 and a flip display 118. The placement of the earpiece 116 on the flip cover 104 causes the earpiece 116 and microphone 114 to have a proper physical relationship to allow talking on the phone. The flip display 118 is able to be on the inside of the flip cover 104, as shown, or the flip display 118 can be located on the opposite side of flip cover 104 to allow viewing of the flip display 118 when the flip cover 104 is closed. The flip cover 104 is also able to include flip cover electronics (not shown) that operate the flip display 118 and provide other processing as is performed in conventional flip phones. The flip cover electronics of the exemplary embodiment are provided electrical power via a flip cover power feed that is connected to power within the body 102 at an edge that is opposite the edge that mounts the flip up antenna 120.

The flip cover 104 of the exemplary embodiment also includes a conductive back 106. The conductive back 106 of the exemplary embodiment comprises a conductive portion of the flip cover and that covers an inner portion of the flip cover 104 when the flip cover 104 is closed. Embodiments of the present invention include flip covers that may or may not have a conductive cover 104 and also that have other conductive portions, such as one or more of a frame, circuit boards, electrical contacts and a flip cover 104 that is entirely covered with a conductive surface.

The exemplary flip phone 100 includes a flip up antenna 120 that is attached to the body 102 and that is mounted by an antenna pivot 122. Antenna 120 pivots around antenna pivot 122 to allow the antenna 120 to move between an extended position (as shown in FIG. 1) and a retracted position as is described and illustrated below. Body 102 of the exemplary embodiment further has a conductive battery cover 108 that forms a conductive surface over the back of body 102 of the exemplary embodiment.

As is described below, the conductive portions of flip cover 104 of the exemplary embodiment, such as conductive back 106, may be electrically grounded to the power supply of the body 102 through a ground connection point that is part of the second pivot 126. As an example, the first pivot 124 of the exemplary embodiment can be non-conductive and does not provide electrical coupling between any portion of the flip cover 104 and the body 102.

Figure 2:
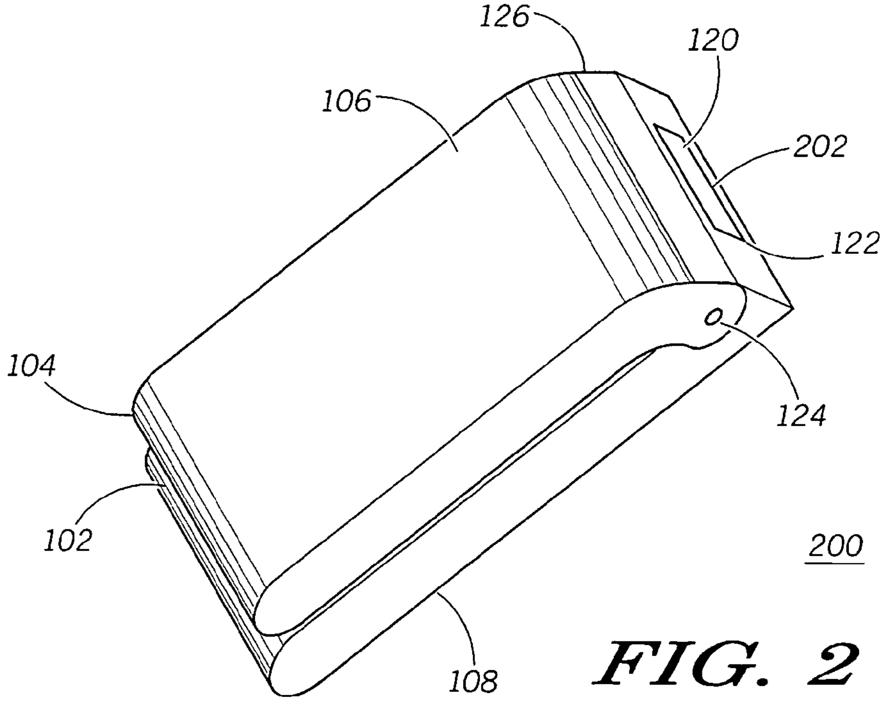
FIG. 2 is an isometric view of the cellular flip phone as shown in FIG. 1 with a closed cover, according to a preferred embodiment of the present invention.

An isometric view of a closed cellular flip phone 200, which is the exemplary flip phone 100 with a closed cover 104 and retracted antenna 120, according to a preferred embodiment of the present invention, is illustrated in FIG. 2. The closed cellular flip phone 200 shows that the flip cover 104 has been pivoted around the flip cover pivot, which consists of first pivot point 124 and a second pivot point 126, to close over the front of the body 102. The closed cellular flip phone 200 also has its antenna 120 retracted into an antenna cavity 202, which is described in detail below.

Figure 3:
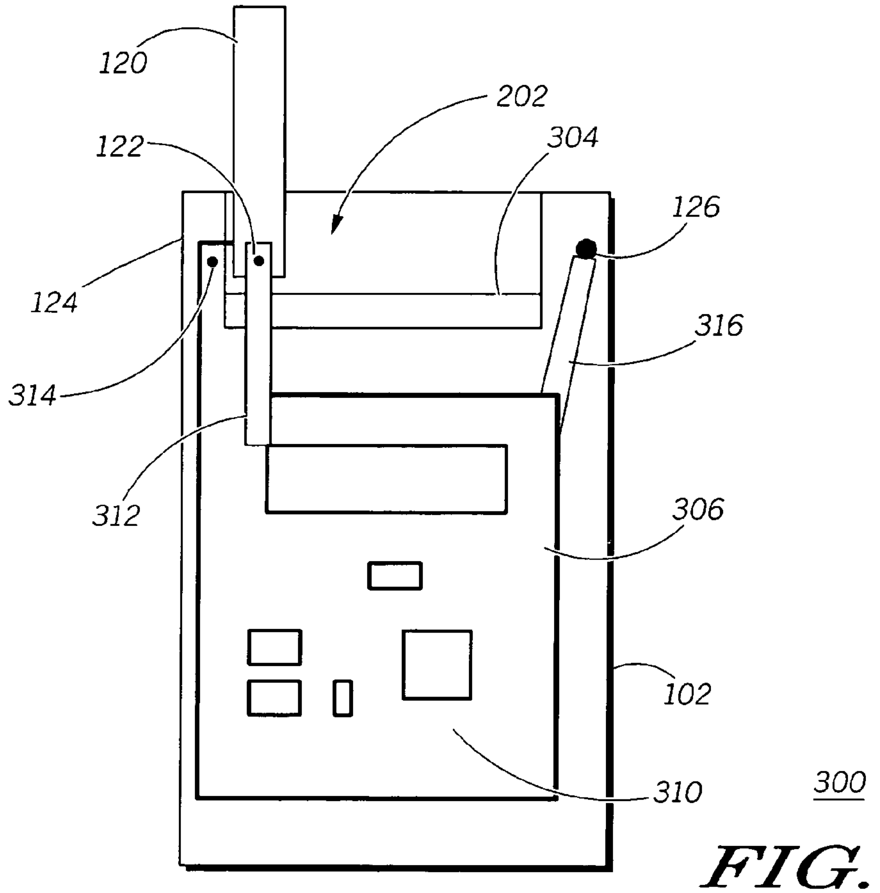
FIG. 3 is a rear view of the cellular flip phone as shown in FIG. 1 with the rear cover removed, according to a preferred embodiment of the present invention.

A rear view 300 of the cellular flip phone 100 with the rear cover 108 removed, according to a preferred embodiment of the present invention, is illustrated in FIG. 3. The body of cellular flip phone 100 includes a Radio Frequency Printed Circuit (RF PC) board 306 that includes RF and supporting circuitry 310 that are used to generate and process RF signals for transmission and reception. The RF and supporting circuitry includes an RF feed 312 that electrically connects antenna 120, through antenna pivot 122, to the RF and supporting circuitry 310. The RF feed 312 electrically conducts both received signals and signals to be transmitted between the RF and supporting circuitry 310 and antenna 120. RF energy is conducted from the RF feed 312 through antenna pivot 122 to the antenna 120, which is described in more detail below. It is to be noted that the RF feed 312 and its connection to antenna 120 are preferably located along a first edge of body 102, namely the edge of body 102 that is near the first pivot point 124.

The RF PC board 306 of the exemplary embodiment further has a body case ground point 314. The body case ground point 314 can be the point that is used to form an electrical ground connection between conductive portions of body 102, such as the battery cover 108 and body front 130, and the electrical circuits of the cellular flip phone 100. It is to be noted that the body case ground point 314 of this exemplary embodiment is located near the first edge of the body 102, namely the edge near the antenna feed 312 and the first pivot point 124. The location and number of case ground points can be adjusted based on frequency band of operation and the form factor of the device. In general the case ground points are optimally located in the region of the phone near the antenna 120 and RF feed 312.

The RF PC board 306 further has a flip case ground connection 316 that is connected to the second pivot point 126 of the exemplary embodiment. It is to be noted that the flip case ground connection is located on a second edge of the body 102, namely the edge that is along the top of the body 102 and substantially opposite the first edge, i.e., the edge where the first pivot point 124 is located. The flip case ground connection 316 of the exemplary embodiment can be the ground connection for the case and electrical components contained within the flip cover 104. Various embodiments of the present invention utilize pivot points that are not conductive or that are not in electrical contact with conductive portions of the flip cover 104. Some embodiments use a conductive cable to connect the conductive portions and/or circuits within the flip cover 104 to the flip case ground connection 316. Embodiments of the present invention that use conductive pivot points, such as the first pivot point 124 and the second pivot point 126, incorporate design features to electrically isolate the flip cover 104 from ground connections within the body 102 except for a connection at the second pivot point or a connection in the vicinity of the second edge of body 102. Such embodiments have, for example, an insulator separating the first pivot point 124 from the flip cover 104 or incorporate an insulating space within the first pivot point 124.

The antenna 120 of the exemplary embodiment pivots around the antenna pivot 122 and retracts into the antenna cavity 202. In operation, conductive portions of the body 102 and other conductive elements of the cellular flip phone

100 cause a change in the resonant frequency characteristics of the antenna 120. In order to compensate for this change, the antenna cavity 202 of the exemplary embodiment has a dielectric load 304 placed at the bottom of the antenna cavity 202. The dielectric load 304 shifts the resonance characteristics of the antenna 120 when the antenna 120 is in its retracted position to be the same as when the antenna 120 is in its extended position. Adjustment of the parameters of the dielectric load 304, such as permittivity and thickness of dielectric material used in either or both of the dielectric load 304 and the antenna 120 itself allows the antenna 120 to exhibit similar radiation characteristics when the antenna is in an extended and retracted position.

Figure 4:
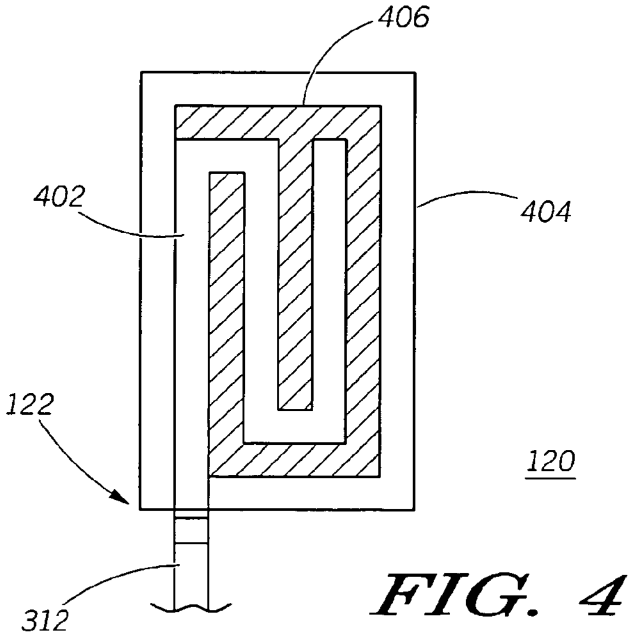
FIG. 4 is a cut-away view of a flip up antenna that is used in the cellular phone illustrated in FIG. 1, according to a preferred embodiment of the present invention.

A cut-away view of a flip up antenna 120 that is used in the exemplary cellular phone 100, according to an exemplary embodiment of the present invention, is illustrated in FIG. 4. The flip up antenna 120 has an electrical connection to the antenna feed 312 through the antenna pivot 122 of the exemplary embodiment. The flip up antenna 120 of the exemplary embodiment incorporates a dielectric substrate 406 with an S-shaped meander line 402. Flip up antenna 120 encapsulates the element 402 in a plastic overmold 404 to provide rigidity and added strength to the flip up antenna 120.

Antenna 120 of the exemplary embodiment is an example of a meander line antenna that can be effectively as described herein. As is understood by ordinary practitioners in the relevant arts, a wide variety of antennas can be similarly incorporated into further embodiments of the present invention. It is also to be understood by practitioners in the relevant arts that a variety of mounting and/or pivoting means are able to be used to allow the antenna 120 to move between the extended position and the retracted position. For example, embodiments of the present invention use sliding antenna structures and/or telescoping antenna structures.

The S-shaped meander line structure of the antenna element 402 of the exemplary embodiment provides a compact structure that supports efficient radiation in multiple RF bands. The frequency response of the flip up antenna 120 is able to be adjusted, as is exhibited in both its extended and retracted position, by adjusting the length of the meander, the gap between the meander lines and the number of meander turns of the antenna element 402. The dielectric substrate of the antenna element 402 is also able to be adjusted, for example by changing permittivity and/or thickness, to modify the radiation characteristics of the antenna 120.

Figure 5:
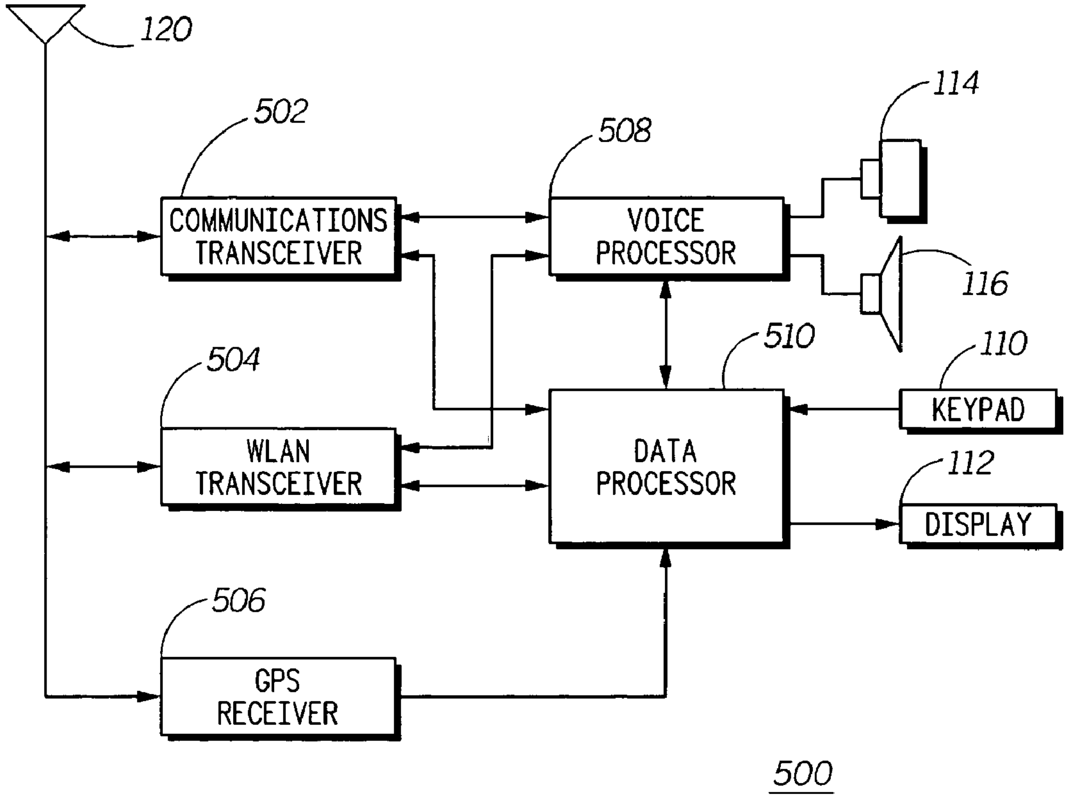
FIG. 5 is a block diagram illustrating a wireless communications device according to an exemplary embodiment of the present invention.

A cellular telephone schematic diagram 500 according to an exemplary embodiment of the present invention is illustrated in FIG. 5. The schematic diagram shows an antenna 120 that is electrically connected to a communications transceiver 502, a Wireless LAN (WLAN) transceiver 504 and a GPS receiver 506. These transceivers and receivers each operate in different RF bands and therefore the antenna 120 is required to efficiently operate in all of these bands. The meander line design of antenna 120, as is described above, advantageously provides this multiple band operation and allows the multiple transceivers and receivers of this exemplary embodiment to operate with a single antenna, as described above.

The communications transceiver 502 and the WLAN transceiver 504 are connected to a voice processor 508. Voice processor 508 performs the processing required to implement voice communications over the wireless interfaces provided by the communications transceiver 502 and/or the WLAN interface 504. The voice processor uses the analog sound interfaces of the cellular phone, such as microphone 114 and earpiece 116, to provide an audible interface with the user of the cellular phone.

The cellular phone of the exemplary embodiment use wireless protocols that communicate voice information in a digital format. The communications transceiver 502 uses a digital cellular phone data format, and the WLAN transceiver uses a wireless data format that is compatible with the Internet Protocol (IP). The voice processor 508 processes the digitized voice data according to either the over-the-air cellular phone protocol implemented by the communications processor 502 or according to a Voice Over IP (VOIP) protocol for use with the WLAN transceiver 504.

The data processor 510 of the exemplary embodiment provides control of the components within the cellular phone as well as processing of user data that communicated over either the communications transceiver 502 or the WLAN transceiver 504. User data includes information to be displayed on display 12 and data entered by the user via keypad 110.

The exemplary embodiment of the present invention advantageously provides a wireless communications device in the form of a flip phone with a conductive metal chassis that includes a conductive shell for the cover and body of the flip phone. The grounding arrangement of the chassis, which results in concentrating ground currents in the body to a point near the antenna feed point and concentrating the flow of ground currents between the flip cover and the body to a point on the body that is opposite the antenna feed point, allows a physically smaller antenna to be used with this metal chassis compared to previous designs. The exemplary embodiment further provides a dielectric loading within an antenna cavity that compensates for the different electrical environment in which the antenna operates when the antenna is retracted into the antenna cavity. This dielectric loading results in improved multi-band performance for the antenna when the antenna is retracted into the cavity and therefore improves communications performance when the antenna is so retracted.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A wireless communications device, comprising:

a body having a first edge and a second edge, the second edge being substantially opposite the first edge;

an electrical ground substantially within the body;

an antenna, the antenna driven by an RF feed, the RF feed being located in the area of the first edge; and a flip cover, the flip cover comprising a conductive portion, wherein the conductive portion is electrically insulated from the electrical ground within the body except for a flip ground connection to the electrical ground within the body, the flip ground connection being located substantially in the area of the second edge.

2. The wireless communications device according to claim 1, further comprising a conductive body portion, the conductive body portion covering at least a portion of the body, wherein the conductive body portion is electrically insulated from the electrical ground except for a body ground connection connecting the conductive body portion to the electrical ground, the body ground connection being located substantially in the area of the first edge.

3. The wireless communications device according to claim 1, wherein the body further comprises an RF PC board, wherein ground currents from the RF PC board are electrically insulated from the electrical ground except for a respective ground connection coupling the RF PC board to the electrical ground, the respective ground connection being located substantially in the area of the first edge.

4. The wireless communications device according to claim 1, wherein the body further comprises at least one of a frame, at least one shield, a battery, at least one battery contact, a battery cover and a combination of these, wherein the at least one of the frame, the at least one shield, the battery, the at least one battery contact, the battery cover and the combination of these are electrically insulated from the electrical ground except for a respective ground connection to the electrical ground, the respective ground connection being located substantially in the area of the first edge.

5. The wireless communications device according to claim 1, wherein the flip cover comprises flip cover electronic circuits.

6. The wireless communications device according to claim 5, further comprising a flip cover power feed for supplying power to the flip cover electronic circuits, wherein the flip cover power feed is electrically connected to power within the body only near the second edge.

7. A wireless communications device, comprising:

a body, wherein the body comprises a conductive body portion;

an antenna cavity located on a surface of the body;

an antenna, the antenna physically mounted to the body at a point near the antenna cavity, wherein the antenna is able to be retracted into the antenna cavity and extended away from the antenna cavity; and a dielectric substrate, the dielectric substrate mounted in proximity to the antenna cavity so as to interact with the antenna when the antenna is retracted into the antenna cavity such that a resonant frequency of the antenna is substantially maintained when the antenna is retracted into the antenna cavity and when the antenna is extended from the antenna cavity.

8. The wireless communications device according to claim 7, further comprising an electrical ground substantially within the body, and wherein the body has a first edge and a second edge, the second edge being substantially opposite the first edge, and wherein the antenna is driven by an RF feed that is located in the area of the first edge, the wireless communications device further comprising a flip cover, the flip cover comprising a conductive portion, wherein the conductive portion is electrically insulated from the electrical ground except for a fun around connection to the electrical ground, the flip ground connection being located substantially in the area of the second edge.

9. The wireless communications device according to claim 8, wherein the conductive body portion is electrically insulated from the electrical ground except for a body ground connection to the electrical ground, the body ground connection being located substantially in the area of the first edge.

10. The wireless communications device according to claim 8, wherein the body further comprises an RF PC board, wherein ground currents from the RF PC board are electrically insulated from the electrical ground except for a respective ground connection coupling the RF PC board to the electrical ground, the respective ground connection being located substantially in the area of the first edge.

11. The wireless communications device according to claim 8, wherein the body further comprises at least one of a frame, at least one shield, a battery, at least one battery contact, a battery cover and a combination of these, wherein the at least one of the frame, the at least one shield, the battery, the at least one battery contact, the battery cover and the combination of these are electrically insulated from the electrical ground except for a respective ground connection to ground in the area of the first edge.

12. The wireless communications device according to claim 8, wherein the flip cover comprises flip cover electronic circuits.

13. The wireless communications device according to claim 12, further comprising a flip cover power feed for conducting power to the flip cover electronics, wherein the flip cover power feed is electrically connected to power within the body only near the second edge.

14. The wireless communications device according to claim 8, wherein the antenna comprises a flip up antenna, the flip up antenna adapted to pivot between around an antenna pivot point between being retracted into the antenna cavity and extended away from the antenna cavity, the dielectric substrate being mounted within the antenna cavity, and wherein the antenna pivot point comprises the RF feed.

15. The wireless communications device according to claim 14, wherein the dielectric substrate comprises an S-shaped meander line structure.

16. The wireless communications device according to claim 7, wherein the antenna comprises a flip up antenna, the flip up antenna adapted to pivot between around an antenna pivot point between being retracted into the antenna cavity and extended away from the antenna cavity, the dielectric substrate being mounted within the antenna cavity.

17. The wireless communications device according to claim 16, wherein the dielectric substrate comprises an S-shaped meander line structure.

18. A wireless communications device, comprising:

a body, wherein the body comprises a conductive body portion, wherein the body has a first edge and a second edge, the second edge substantially opposite the first edge, and wherein the antenna is driven by an RF feed that is located in the area of the first edge;

an electrical ground substantially within the body;

an antenna cavity located on a surface of the body;

an antenna, the antenna physically mounted to the body at a point near the antenna cavity, wherein the antenna is able to be retracted into the antenna cavity and extended away from the antenna cavity;

a dielectric substrate, the dielectric substrate mounted in proximity to the antenna cavity so as to interact with the antenna when the antenna is retracted into the antenna cavity such that a resonant frequency of the antenna is substantially maintained when the antenna is retracted into the antenna cavity and when the antenna is extended from the antenna cavity; and a flip cover, the flip cover comprising a conductive portion, wherein the conductive portion is electrically connected to ground within the body substantially in the area of the second edge.

* * * * *